United States Patent [19]

Rutty et al.

[11] Patent Number: 4,551,854

[45] Date of Patent: Nov. 5, 1985

[54] ANTI-BLOCKING DEVICE INCLUDING STUCK MICROPHONE RELIEVER FOR AIRCRAFT VOICE COMMUNICATION SYSTEM

[76] Inventors: John G. Rutty, R.D. 5, Box 292; Alfred Arndt, R.D. 4, Box 346, both of, Hanover, Pa. 17331

[21] Appl. No.: 525,461

[22] Filed: Aug. 22, 1983

[51] Int. Cl.[4] .............................................. H04B 1/44
[52] U.S. Cl. ...................................... 455/78; 455/58; 455/83; 455/89
[58] Field of Search ...................... 455/78, 79, 83, 89, 455/58; 375/70

[56] References Cited

U.S. PATENT DOCUMENTS

| | | |
|---|---|---|
| 1,612,448 | 12/1926 | Latour . |
| 2,577,751 | 12/1951 | Halstead . |
| 2,662,974 | 12/1953 | Dorff . |
| 2,691,723 | 10/1954 | Nordahl . |
| 2,731,622 | 1/1956 | Doremus et al. . |
| 2,731,635 | 1/1956 | Walker . |
| 2,858,420 | 10/1958 | Lutz . |
| 2,932,729 | 4/1960 | Yamato et al. . |
| 3,283,074 | 11/1966 | Csicsatka ........................ 455/79 |
| 3,469,191 | 9/1969 | Russell, Jr. et al. ............. 455/78 |
| 3,500,458 | 3/1970 | Cannalte ......................... 455/79 |
| 3,500,459 | 3/1970 | Battin et al. .................... 455/78 |
| 3,938,156 | 2/1976 | Lunden . |
| 4,013,959 | 3/1977 | Patterson . |
| 4,085,365 | 4/1978 | Reick .............................. 455/78 |
| 4,199,661 | 4/1980 | White et al. . |
| 4,259,663 | 3/1981 | Gable . |
| 4,366,578 | 12/1982 | Foster et al. .................... 455/79 |

OTHER PUBLICATIONS

Nigel M. Corrigan, "Simultaneous Transmissions Can Be Avoided", Letter Published in *Flight International*, Jan. 3, 1981, p. 32.

*Primary Examiner*—Marc E. Bookbinder
*Attorney, Agent, or Firm*—Kerkam, Stowell, Kondracki & Clarke

[57] ABSTRACT

Systems for preventing channel blockage on aircraft voice communication frequencies caused either by a pilot beginning a transmission while someone else is transmitting on the same channel (i.e., "stepping on" or "blocking" the first transmission), or by a "stuck microphone" condition resulting from undesired activation of the microphone switch circuit. In accordance with the invention, a "step-off" device (SOD) and a "stuck microphone reliever" (SMR) are combined in a single device, termed an "anti-blocking device" (ABD). The entire device may be provided in retrofit form and draws all its operating power from the radio push-to-talk switch line, with no internal modification to the radio required. The step-off device portion of the anti-blocking device senses when a selected radio frequency is in use, and when in use, prevents transmission even when the microphone switch circuit is operated. The stuck microphone reliever includes a transmitter-disabling means connected to the microphone switch circuit for limiting any transmission to a predetermined duration even though the microphone switch circuit is activated for a longer duration.

20 Claims, 5 Drawing Figures

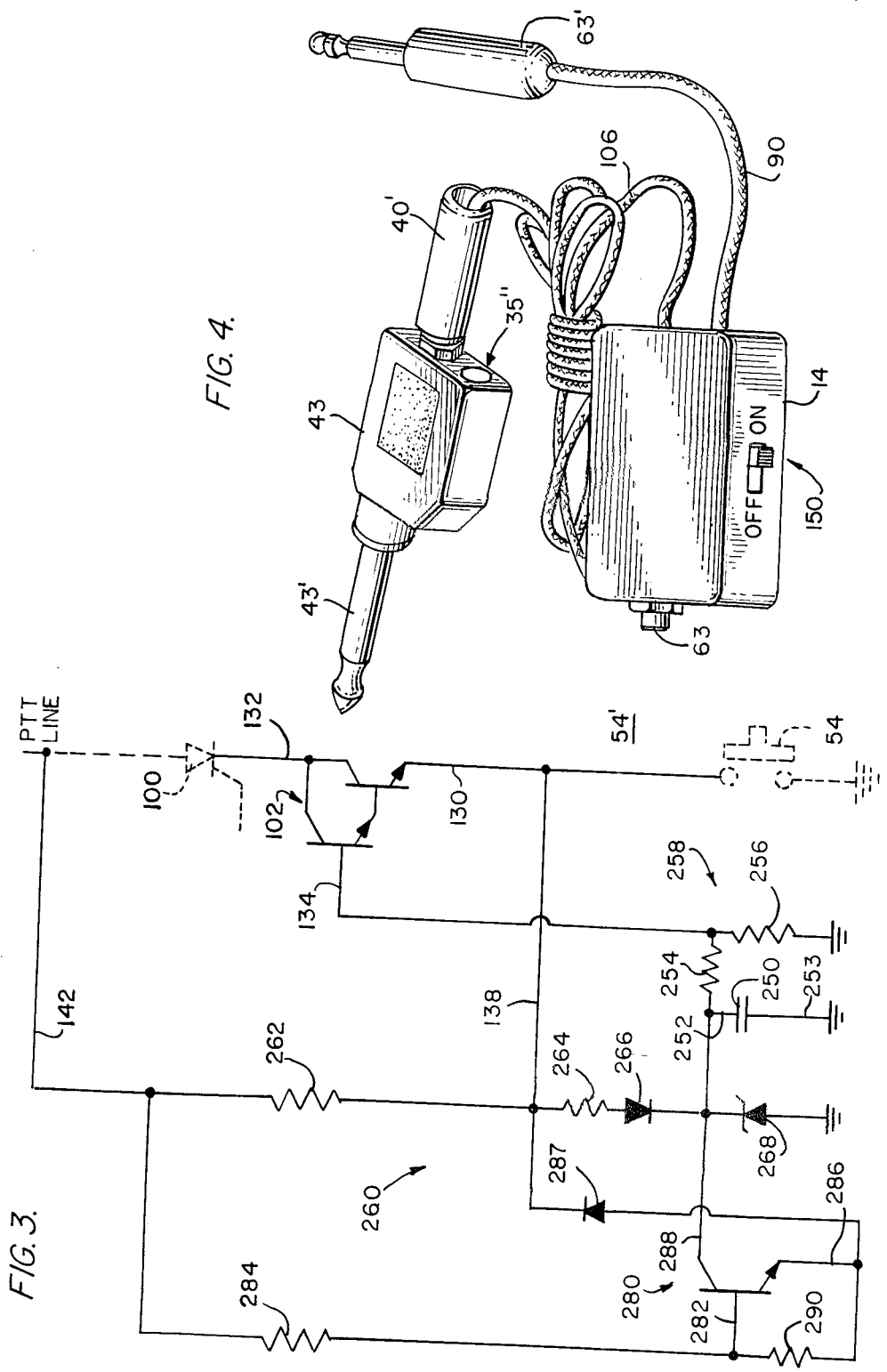

ANTI-BLOCKING DEVICE INCLUDING STUCK MICROPHONE RELIEVER FOR AIRCRAFT VOICE COMMUNICATION SYSTEM

BACKGROUND OF THE INVENTION

The present invention relates generally to aircraft voice communication radios such as are normally employed in two-way communication with air traffic control facilities. More particularly, the invention relates to means for preventing interference of the type which arises when two or more radios are transmitting on the same channel frequency.

Two-way voice communications between aircraft and ground-based air traffic control facilities are generally carried out by means of VHF communications transceivers, customarily termed "COM" radios. Typically, COM radios employ amplitude modulation (AM) and operate in a frequency band from 118.0 MHz to 135.95 MHz on any of a plurality of selectable discrete channel frequencies, e.g., on any one of 720 defined channels, with 0.025 MHz channel spacing.

At each radio location, whether within an aircraft or at an air traffic control facility, there is typically a manually-operable push-to-talk (PTT) switch connected through a suitable microphone switch circuit for activating the transmitter circuitry and de-activating the receiver circuitry. Thus, the normal or stand-by mode is the receiver mode. In the case of a hand-held microphone, the PTT switch is normally included within a microphone housing including both a microphone element and the PTT switch. A microphone cord includes both audio and PTT control conductors, and teminates in a suitable microphone plug. In other cases, a so-called boom microphone element is attached to a headset assembly, and the microphone switch is located elsewhere, for example, on the aircraft control yoke. In some cases, the microphone switch is even voice activated. In any event, the transmitter circuitry can be activated any time at the discretion of the radio operator, such as the aircraft pilot.

With such a channelized two-way voice communication system, it will be appreciated that only one station at a time can be transmitting on any given channel frequency (within the distance range of the equipment). The consequence of two transmissions at once in many cases is that neither transmission is intelligible at the receiving station. In other words, the particular radio frequency channel is temporarily rendered useless. This is particularly so since amplitude modulation (AM) is employed in the type of aircraft communications radio here concerned, rather than frequency modulation (FM). FM communications systems exhibit a "capture effect" whereby the strongest signal presented to a receiver is heard clearly, to the complete exclusion of the other, weaker transmissions. However, in AM communication systems, all transmissions on a particular channel frequency are heard in the receiver causing mutual interference. Moreover, since the actual carrier frequencies of several transmitters nominally on the same channel frequency are rarely in fact identical, but rather can differ by up to several KHz, hetrodynes or beat notes in the form of one or more squeals are normally heard in an AM receiver when more than one transmitter is on the same channel frequency, increasing the effect mutual interference.

There are, in general, two types of situations which lead to the undesirable result of two simultaneous transmissions on a single radio frequency channel. One of these types of situations results from poor radio operating technique, and the other results from equipment malfunction.

More particularly, in order to ensure that a particular channel frequency is not already in use, proper radio operating technique is to always listen before transmitting on the particular channel frequency. However, in practice, proper technique is not always followed. Occasionally pilots transmit on a channel frequency at the same time someone else, either an aircraft or a ground facility, is transmitting on the same channel. This is known as "stepping on" or "blocking" the other transmission.

Even if proper radio technique is being employed, equipment malfunction can cause an inadvertant transmission to occur. More specifically, the microphone switch circuit is susceptible to undesired activation. This undesired activation typically occurs as the result of a short circuit in the microphone cord, the connectors, or the push-to-talk switch itself. Also, there are instances where a microphone is not properly returned to its holder, and instead, is left in a location (e.g., on a seat) where the push-to-talk switch is inadvertantly actuated through contact with another object. Although one of these typical situations is an equipment malfunction and the other is actually a form of improper operation, the term "undesired activation" of the push-to-talk switch circuit is herein employed to refer to these and similar situations. Also, it may be noted that the term "stuck microphone" or "stuck mic" is commonly employed to refer to this condition, and the term is also employed herein.

In many two-way communications systems, the channel blockage which results from two simultaneous transmissions on the same channel may be no more than a minor annoyance. However, in the context of an aircraft communication system, such situations are potentially hazardous. This is particularly so because, in busy air traffic control situations, a controller may be communicating in rapid sequence with a number of aircraft employing brief messages and terse phraseology to maximize the amount of information which can be communicated in a short period of time. At aircraft speeds, situations develop rapidly, and it is important that aircraft communications proceed in a smooth fashion. The potentially hazardous consequence of a missed communication during a critical phase of flight will be well appreciated.

As a partial solution to the problems, our previous U.S. patent application Ser. No. 466,318, filed Feb. 14, 1983, entitled "STEP-OFF DEVICE FOR AIRCRAFT VOICE COMMUNICATION SYSTEM", now U.S. Pat. No. 4,494,244, is directed to systems and devices for preventing the operator of an aircraft radio from beginning a transmission while someone else is transmitting on the same channel. Since this improper technique is commonly referred to as "stepping on" a transmission, we have termed the device which prevents this a "step-off" device (SOD).

Briefly, our previously-disclosed step-off device (SOD) is appropriately connected to the receiving circuitry of the aircraft communication radio to sense when a selected radio frequency channel is in use. When the selected channel is in use, operation of the associated transmitter circuitry is inhibited even though the push-to-talk switch is operated. A particularly advantageous form of step-off device is an external device intended for retrofit connection to an aircraft voice communication type which has ground connection-activated push-to-talk switch circuitry, and the external form of step-off device advantageously derives its operating power from the push-to-talk switch circuit. Thus, no modification is required to either the radio receiver wiring or the aircraft electrical system which otherwise might be required for the purpose of deriving operating power, nor are batteries required which would necessitate frequent replacement to maintain proper operation. Additional details may be had by reference to our U.S. Pat. No. 4,494,244, the entire disclosure of which is hereby expressly incorporated by reference.

Our previous step-off device however does not address the problem of equipment malfunctions of the type summarized above, which lead to undesired activation of the microphone switch circuit. In the case of a "stuck microphone", our previous step-off device at best waits until no other radio is transmitting before allowing the channel to be blocked. However, once transmission begins, our previous step-off device allows such blockage to continue.

In some respects, a "stuck microphone" is far more serious than one transmission "stepping on" or blocking another because a "stuck microphone" is likely to be of much longer duration. The problem of one transmission "stepping on" another is normally a short-term one, and therefore does not result in long-term channel blockage.

SUMMARY OF THE INVENTION

It is an overall object of the invention to provide systems applicable to aircraft radio communication systems for alleviating the undesirable results of a "stuck microphone" condition caused by undesired activation of the microphone switch circuit. The subject device accordingly is, for convenience, termed a "stuck microphone reliever" (SMR).

While stuck microphone relievers in accordance with the invention can readily be included in newly manufactured aircraft radios as an integral part of their circuitry, it is another object of the invention, to provide a stuck microphone reliever which can readily be externally connected to an aircraft radio to provide the required function without any modification whatsoever to the basic radio.

It is a related object of the invention to provide a compact, external form stuck microphone reliever which derives its operating power from the aircraft radio to which it is connected.

It is a further object of the invention to provide an external form stuck microphone reliever, which derives its operating power from the radio to which it is connected, and which is operable, without modification or adjustment, from a relatively wide range of high voltages, e.g., from +12 to +28 volts as are found in various specific radio models.

It is another object of the invention, to provide a stuck microphone reliever (SMR) which is fully compatible with the step-off device (SOD) to which our U.S. Pat. No. 4,494,244 is directed.

It is another object of the invention, to provide a comprehensive protection device, herein termed "anti-blocking device" (ABD) which combines both a step-off device (SOD) and a stuck microphone reliever (SMR) in a single, compact external device which derives its operating power from the aircraft radio to which it is connected.

Briefly, and in broad concept, a stuck microphone reliever (SMR) in accordance with the invention includes a transmitter-disabling means connected to the microphone switch circuit for limiting any transmission to a predetermined duration even though the microphone switch circuit is activated for a longer duration. For example, the predetermined duration is preferably in the order of fifteen seconds.

Such an SMR device is based on the recognition that, in the aircraft voice communication environment, the duration of any single transmission is relatively short, and actual observation has shown that fifteen seconds is an adequate outer limit. Thus, in the event a "stuck microphone" condition is caused by undesired activation of the push-to-talk switch circuit, transmission is limited to the predetermined duration, e.g. fifteen seconds, and thereafter prevented. Upon the conclusion of a normal transmission, the circuitry of the SMR device immediately resets itself upon release of the push-to-talk switch such that subsequent transmissions can each be up to the predetermined duration in length.

In accordance with another broad concept of the invention, an anti-blocking device (ABD) is provided, which combines both a step-off device (SOD) and a stuck microphone reliever (SMR). In this combination device, the stuck microphone reliever portion is as summarized above, and the step-off device portion is substantially as described in our U.S. Pat. No. 4,494,244. Thus, the herein-disclosed SMR is fully compatible with the SOD.

Briefly, the step-off device portion of the overall anti-blocking device includes sensing means connected to the receiver circuitry for sensing when a particular selected radio frequency is in use. A transmitter-disabling means is connected to the sensing means and to the transmitter circuitry for preventing activation of the transmitter circuitry by the push-to-talk switch circuit when the particular selected radio channel is in use.

The stuck microphone reliever of the overall anti-blocking device, as summarized above, includes another transmitter-disabling means connected to the push-to-talk switch circuit and to the transmitter circuitry for limiting any transmission to the predetermined duration even though the push-to-talk switch circuit is activated for a longer duration.

One particular embodiment of a stuck microphone reliever in accordance with the invention is intended for retrofit connection to an aircraft voice communication radio of the general type summarized above, the radio also including ground connection-activated push-to-talk circuitry for manually activating the transmitter circuitry and de-activating the receiver circuitry when a ground return connection is completed through push-to-talk switch circuitry including the actual push-to-talk switch contained, for example, in a microphone housing. As is known, such push-to-talk circuitry typically includes a voltage supply line providing a supply voltage (e.g. 12 or +28 volts) with respect to a circuit reference node (e.g. ground). Such circuitry also includes a controlled switching element, such as a relay, having an output portion (e.g. relay contacts) operably connected for selectively activating the transmitter circuitry and de-activating the receiver circuitry and having a control input portion (e.g. an electromagnetic relay coil) with a pair of input terminals for activating the output portion when at least a predetermined input current level flows through the coil between the input terminals. The voltage supply line is connected to one of the pair of switching element input terminals, and a push-to-talk control terminal is connected to the other of the pair of switching element control terminals and arranged for connection to a manually-operable push-to-talk switch for completing a series electrical circuit to the circuit reference node. Thus, when the push-to-talk switch is actuated, a ground return circuit is completed, energizing the relay coil, and causing the relay contacts to switch to the transmit position.

Such a radio normally has a microphone receptacle for receiving a microphone cord having conductors both for the microphone circuit and for the PTT line, and terminating in a plug. A microphone receptacle may be located either on the radio itself or on a panel of the aircraft. In the external form embodiments of the invention, whether in the form of a stuck microphone reliever (SMR) or in the form of an anti-blocking device (ABD) including both a stuck microphone reliever (SMR) and a step-off device (SOD), a relatively compact circuit-containing enclosure is externally interposed in series between the microphone plug and the radio receptacle. Thus, the subject device plugs into the radio microphone receptacle, and the microphone cord in turn plugs into the subject device. A microphone case itself could alternately enclose the invention.

Advantageously, the anti-blocking device (ABD) or stuck microphone reliever (SMR) of the invention derives its operating power from the push-to-talk circuit. Thus no modification whatsoever is required to either the radio receiver wiring or the aircraft electrical system, which otherwise might be required for the purpose of deriving operating power. Nor are batteries required which would necessitate frequent replacement to maintain proper operation. Moreover, the specific embodiments disclosed herein of the subject devices are not at all critical insofar as the precise supply voltages concerned and operate properly at least a range of from +12 volts to +28 volts.

In another particular embodiment, an anti-blocking device (ABD) in accordance with the invention includes both a step-off device (SOD) such as is disclosed in our previous patent application Ser. No. 466,318, and a stuck microphone reliever (SMR) as herein described in detail. The step-off device and the stuck microphone reliever include respective controlled conduction elements interposed generally in series with each other between the push-to-talk switch circuit (including the actual microphone push-to-talk switch itself) and the PTT line such that the transmitter circuitry can be activated only when both of the controlled conduction elements are conducting.

As disclosed in our U.S. Pat. No. 4,494,244 the controlled conduction element of the step-off device is preferably a thyristor having a pair of main terminals and a gate terminal for triggering conduction between the main terminals The thyristor main terminals are electrically interposed in series between push-to-talk control terminal and the push-to-talk switch circuits.

The step-off device portion of the overall anti-blocking device further includes a triggering circuit having an input connected to sense the received audio signal and having an output connected to the thyristor gate terminal. The triggering circuit is operable to supply a gating signal to the thyristor gate terminal only when the received audio signals is below a predetermined threshold level. A power supply circuit is included for supplying operating voltage to the triggering circuit. The power supply circuit derives voltage from the voltage supply line by means of a connection to the push-to-talk control terminal. Thus, voltage is available through the control input portion of the controlled switch element of a radio during those periods of operation when the controlled switching element is not actuated. The power supply circuit includes at least sufficient series-connected current-limiting impedance for limiting current through the power supply circuit to a level below the predetermined input current level of the controlled switching element.

The controlled conduction element of the stuck microphone reliever (SMR) portion of the overall anti-blocking device (ABD) is a device preferably a semiconductor, having a pair of main terminals and a control gate terminal for controlling conduction between the main terminals. By way of example, the controlled conduction element of the stuck microphone reliever may comprise a Darlington transistor or a power field-effect transistor (FET). In either event, the main terminals of the controlled conduction element of the SMR are electrically interposed in series between the push-to-talk control terminal and the push-to-talk switch circuit.

The stuck microphone reliever also includes a timing circuit connected to the control gate terminal and operable to activate the controlled conduction elements for a predetermined limited duration upon actuation of the push-to-talk switch circuit, and to thereafter inactivate the controlled conduction element so long as the push-to-talk circuit remains activated. Preferably, the timing circuit comprises an RC timing circuit.

The stuck microphone reliever also includes a power supply circuit for supplying operating voltage to the timing circuit. As in the case of the power supply circuit for the SOD portion of the overall anti-blocking device, the SMR power supply circuit includes a connection to the push-to-talk control terminal for deriving voltage from the voltage supply line through the control input portion of the controlled switching element during those periods of operation when the control switching element is not actuated. Again, at least sufficient series-connected current-limiting impedance is included to limit current to a level below the predetermined input current level of the controlled switching element.

In particular circuitry disclosed herein, the controlled conduction element of the stuck microphone reliever conducts when a voltage in excess of a threshold voltage is applied to the control gate terminal with respect to one of the main terminals. This one main terminal defines a circuit control node and is connected to the push-to-talk switch circuit such that the circuit control node is connected to the circuit reference node (ground reference) when the push-to-talk switch circuit is activated, either by intentional operation of the push-to-talk switch or through a "stuck microphone" fault.

The timing circuit comprises a timing capacitor, one terminal of which is connected for applying a voltage dependent upon the charge stored in the capacitor to the control gate terminal. The other terminal of the capacitor is connected to the circuit reference node, i.e., ground. A timing resistance is connected for discharging the capacitor at a controlled rate which defines the predetermined limited duration, for example, fifteen seconds. Finally, the stuck microphone reliever includes a connection for charging the timing capacitor from the power supply circuit.

As a result of this circuit arrangement, upon actuation of the push-to-talk switch circuit, voltage from the timing capacitor is effectively applied between the control gate terminal and the one main terminal to cause the control conduction element of the stuck microphone reliever to conduct until the timing capacitor is discharged to a point where the voltage supplied to the control gate terminal is no longer in excess of the threshold voltage.

Preferably, the connection for charging the timing capacitor includes a shunt connection to the circuit control node such that the timing capacitor cannot be recharged so long as the push-to-talk switch circuit is activated.

For a sharper and more stable turn-off characteristic, the stuck microphone reliever additionally includes a controlled shunting element having a control input connected to sense voltage on the other of the main terminals of the controlled conduction element of the stuck-microphone reliever, and having main terminals connected for rapidly discharging the timing capacitor when the controlled conduction element of the stuck microphone reliever begins to cease conducting.

BRIEF DESCRIPTION OF THE DRAWINGS

While the novel features of the invention are set forth with particularity in the appended claims, the invention, both as to organization and content, will be better understood and appreciated from the following detailed description taken in conjunction with the drawings in which:

FIG. 3 is a detailed electrical schematic diagram of the stuck-microphone reliever portion of the FIG. 1 anti-blocking device; and FIG. 4 is a drawing depicting the physical appearance of an anti-blocking device which is adapted for retrofit connection to an aircraft radio.

DETAILED DESCRIPTION

Figure 1:
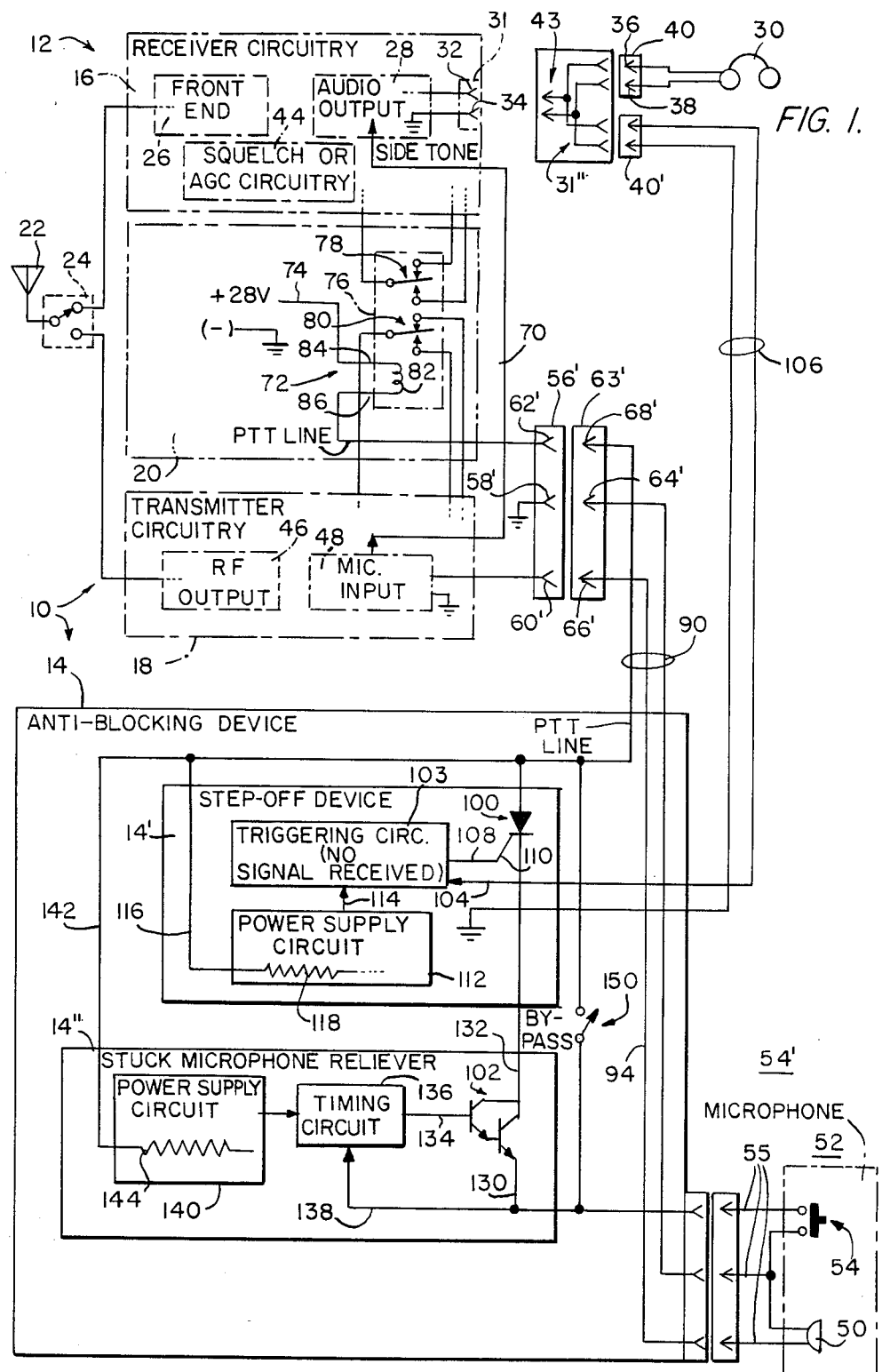
FIG. 1 is an electrical schematic depiction, partially in block diagram form, of an aircraft voice communication radio including an anti-blocking device in accordance with the invention shown externally connected to the aircraft radio.

Referring first to FIG. 1, shown in an overall combination 10 is an aircraft voice communication radio 12 of generally conventional type combined with an anti-blocking device (ABD), generally designated 14, in accordance with the present invention. The anti-blocking device (ABD) in turn is a combination of a step-off device (SOD) 14', such as is disclosed in our above-incorporated U.S. Pat. No. 4,494,244, and a stuck microphone reliever (SMR) 14".

The aircraft voice communication radio 12 more particularly includes radio receiver circuitry 16 and radio transmitter circuitry 18 selectively operable on any one of a plurality of radio frequency channels, for example, in the 118.0 MHz to 135.95 MHz frequency band. Closely associated with the receiver 16 and transmitter 18 circuitry is circuitry 20 common to both the receiver 16 and transmitter 18 circuitry and including such common elements as power supply (not specifically shown) and common control circuitry such as transmit/receive changeover circuitry. The receiver 16 and transmitter 18 circuitry share a common antenna 22, which is switched between the receiver 16 and transmitter 18 circuitry by means of a transmit/receiver 24, which may comprise either an electromechanical relay or a solid-state transmit/receive switch depending upon the design of the specific receiver 16, transmitter 18 and common control 20 circuitry.

It will be appreciated that the elements in FIG. 1, as thus far described, comprise general elements of aircraft voice communication radios such as are available from various manufacturers. A feature of the present invention is that it may be used in combination with virtually any existing aircraft voice communication radio. Accordingly, the present invention is not directed specifically to the receiver 16, transmitter 18 and common circuitry 20. Rather, these circuits comprise the environment within which the present invention is employed.

Typically, the receiver circuitry 16 includes various front end stages 26, connected to the antenna 22 through the transmit/receive switch 24. The receiver circuitry 16 also includes an audio output stage 28 connected to a headset 30 through a microphone circuit jack 31 having a pair of connector terminals 32 and 34 which are intended to mate with a pair of corresponding connector terminals 36 and 38 carried by a plug 40 at the end of a headset cord 42.

To enable the step-off device 14' of the anti-blocking device 14 to sense receiver audio output, there is provided a dual-socket "Y" adaptor shown schematically at 43 and which plugs as at 43' directly into the earphone circuit jack 31 of the receiver circuitry 16. The dual socket "Y" adaptor 43 includes an output jack 31" for receiving the headset 30 plug 40, and another jack 31" electrically in parallel with the jack 31', for receiving a plug 40' facilitating connection to the step-off device 14'.

The receiver circuitry 16 additionally includes a box designated 44 and indicated as including squelch or automatic gain control (AGC) circuitry. Typical receivers in aircraft include both AGC and squelch, and the presence of the box 44 thus labeled indicates that the step-off device 14' portion of the anti-blocking device 14 may be connected to either the squelch or the AGC circuitry.

As is known, AGC circuits are generally included in all radio receiver circuits, and squelch circuitry is included in generally all radio receiver circuits for channelized communication. Both are generally responsive to received signal level. The function of the AGC circuitry is to adjust the gain of the receiver circuitry, such as the gain of the front end 26, such that all received signals are presented to the headset 30 at approximately the same amplitude, regardless of the received signal strength. Generally included in AGC circuitry is a particular circuit node or conductor termed an AGC line which carries a voltage representative of received signal strength. The function of squelch circuitry is to mute the receiver audio ouput during periods when no received signal is present in order to avoid undue noise in the headset 30. In AM receivers the squelch control voltage is typically derived from the AGC circuit, and thus is carrier-responsive. The output of the squelch circuitry is typically a switching signal voltage which abruptly changes from one voltage to another when the receiver is to be muted and vice-versa.

It will be appreciated that the receiver circuitry 16 includes numerous conventional elements in addition to the front end 26, audio output 28, and squelch or AGC circuitry, for example, intermediate frequency stages and detector circuitry.

The transmitter circuitry 18 includes an RF output stage 46 also connected to the antenna 22 through the transmit/receive circuitry 24. Included in the transmitter circuitry 18 is a microphone input stage 48, typically comprising an audio amplifier. The function of the microphone input stage 48 is to amplify the low-level audio output from a microphone element 50 included within a hand-held microphone housing 52, which also includes a push-to-talk (PTT) switch 54.

As may be seen in FIG. 1, connected to the microphone 52 by means of a cord 55 is a microphone plug 56 which includes a circuit reference (ground) connector terminal 58, a microphone audio circuit connector 60, and a push-to-talk connector terminal 62. As originally manufactured and in the absence of anti-blocking device 14, the microphone plug 56 is intended to mate with a microphone circuit receptacle 56' of the aircraft radio 12, the aircraft radio microphone circuit receptacle 56 having corresponding connector terminals 58', 60' and 62'. It will be appreciated that the terminal 62' may also be viewed as the radio push-to-talk control terminal.

The microphone 52 and components within, the cord 55 and the plug 56 together comprise what is herein termed a push-to-talk switch circuit, generally designated 54'. Since other forms of activation are possible, e.g. voice activation, the more general term "microphone switch circuit" 54' is also employed herein. As described hereinabove, this circuit 54' is susecptible to undesired activation. In other words the push-to-talk or microphone switch circuit 54' is susceptible to a "stuck microphone" condition, and it is the function of the stuck microphone reliever 14" to alleviate this condition when it occurs.

However, inasmuch as the external form of anti-blocking device 14 is intended to be interposed in series between the microphone plug 56 and the microphone circuit receptacle 56' of the radio 12, the anti-blocking device 14 includes a microphone receptacle 63 for receiving the microphone plug 56, and a microphone circuit plug 63' for mating with the microphone circuit receptacle 56' of the radio 12. The receptacle 63 has individual connector terminals 64, 66 and 68 corresponding to connector terminals 64', 66' and 68' of the microphone circuit plug 63'.

It will be appreciated that the transmitter circuitry 18 also includes numerous conventional elements in addition to the RF output stage 46 and the microphone input stage 48, for example, frequency-determining circuitry and modulation circuitry.

To provide a sidetone signal during periods of transmitting, a line 70 is connected from the microphone input circuitry of the transmitter 18 to the audio output circuitry 28 of the receiver circuitry 16.

The final relatively conventional element in FIG. 1 is the common circuitry 20 While the common circuity 20 may include a number of elements depending upon the particular radio, for present purposes it is sufficient to note that the common circuitry 20 includes ground connection-activated push-to-talk (PTT) circuitry 72 for manually activating the transmitter circuitry 18 and de-activating the receiver circuitry 16 when the microphone PPT switch 54 is operated. More particularly, there is a voltage supply line 74 supplied from a suitable source of power, such as the aircraft electrical system.

While the voltage supply line 74 is designated is FIG. 1 as having +28 volts applied thereto, it will be appreciated that this voltage is exemplary only, and that different voltages are employed in different aircraft and aircraft radios. For example, the electrical systems of many general aviation aircraft and radios operate from +12 volts. It is a feature of the subject invention that it may be employed regardless of the particular supply voltage.

Also included in the common circuitry is a controlled switching element in the form of a PTT relay 76 having an output portion in the form of contacts 78 and 80 operably connected for selectively activating the transmitter circuitry 18 and de-activating the receiver circuitry 16, and having a control input portion in the form of coil 82 with a pair of input terminals 84 and 86 for activating the output portion 78 and 80 when at least a predetermined input level flows through the coil 82 between the input terminals 84 and 86. In FIG. 1, connections from the contacts 78 are shown in highly generalized fashion extending into the receiver circuitry 16 and the connections from the contacts 80 are shown extending in highly generalized fashion into the transmitter circuitry 18 in order to appropriately effect changeover from receive mode to transmit mode and vice-versa. The specific connections are not shown inasmuch as these are dependent upon the particular receiver and transmitter circuitry, to which the present invention is not specifically directed.

The exemplary +28 volt supply line 74 is connected to one 84 of the co1 82 terminals, and the other 86 of the coil terminals 82 is arranged for connection via a PTT line 87 to the PTT switch 54 for completing a series electrical circuit to circuit ground. Thus, when the PTT line 87 is grounded, the relay coil 82 is energized, switching the relay 76 from receive mode to transmit mode.

As noted above, the external form of anti-blocking device 14 in accordance with the invention is intended to be simply interposed in series between the microphone plug 56 and the radio microphone circuit receptacle 56'. Accordingly, the microphone receptacle 63 is carried by the enclosure of the anti-blocking device 14. The microphone circuit plug 63' is at the distal end of a suitable flexible multi-conductor cord 90 extending from the anti-blocking device 14 enclosure, although, as will be appreciated, the microphone circuit plug 63' may also be attached directly to the anti-blocking device 14 enclosure.

Within the anti-blocking device 14 enclosure a ground electrical connection is completed via a line 92 between the circuit reference connector terminal 64 of the microphone receptacle 63 and the circuit reference connector terminal 64' of the microphone circuit plug 63. Similarly, audio from the microphone element 50 is passed directly though the anti-blocking device 14 via a line 94.

Within the anti-blocking device 14, the step-off device 14' and the stuck microphone reliever 14" include respective controlled conduction elements 100 and 102 interposed generally in series with the ITT line between the push-to-talk control terminal 62' and the push-to-talk switch circuit 54' such that the transmitter circuitry 18 can be activated only when both of the controlled conduction elements 100 and 102 are conducting (and the push-to-talk switch circuit 54' is activated).

An exemplary embodiment of the step-off device 14' is described in detail hereinafter with reference to FIG.

2, and an exemplary embodiment of the stuck microphone reliever is described in detail hereinafter with reference to FIG. 3. The SOD 14' and SMR 14" are described in more general form next below with reference to FIG. 1.

The controlled conduction element 100 of the anti-blocking device 14 more particularly comprises a thyristor such as a silicon-controlled rectifier (SCR). In order to appropriately gate the SCR 100, also included within the step-off device 14' is a triggering circuit 103 having an input 104 connected to sense the received audio signal. Preferably, this is accomplished via a cord 106 terminating in the plug 40' which plugs into the scoket 31" of the dual-socket "Y" adaptor 43.

The triggering circuit 103 has an output 108 connected to the gate terminal 110 of the SCR 100 and is operable to supply the gating signal to the gate terminal 110 only when the received audio signal level is below a predetermined threshold level.

The final element included within the step-off device portion 14' of the overall anti-blocking device 14 is a power supply circuit 112 for supplying operating voltage via a line 114 to the triggering circuit 103. The power supply circuit 112 includes a connection 116 to the PTT line for indirectly deriving voltage from the exemplary +12 volt voltage supply line 74 through the relay coil 82 during those periods of operation when the PTT relay 76 is not actuated. In order to limit current through the power supply circuit 112 to a level below the predetermined input current level of the relay 76 at which the relay 76 is actuated, the current limiting impedance, represented by a resistor 118, is included within the power supply circuit 112.

It will be appreciated that the step-off device 14' thus derives its operating voltage from the aircraft radio 12 itself, whatever that operating voltage may be, and no internal connections to the radio circuitry are required.

Considering operation of the step-off device portion 14' of the overall anti-blocking device 14, when receiver audio output level as sensed by the triggering circuit 102 is below the predetermined threshold indicating that the selected radio frequency channel is not in use, the SCR 100 is gated, and the step-off device portion 14' of the overall anti-blocking device 14 will permit the push-to-talk relay 76 to be actuated whenever the push-to-talk circuit 54' is actuated if not otherwise prevented by the stuck microphone reliever 14", more particularly, the controlled conduction element 102 thereof. Once the SCR 100 begins conducting it remains conducting even though it no longer is gated so long as current flow is in excess of the holding current rating of the particular SCR 100 device selected. The SCR 100 will be no longer gated as, initially, sidetone audio output causes the triggering circuit 103 to remove the SCR gating signal and, thereafter, the power supply circuit 112 no longer supplies power to the triggering circuit 102 because the PTT line is nearly at ground potential.

On the other hand, during receive mode when the triggering circuit 103 senses an audio output level indicating that the particular radio frequency channel to which the receiver circuitry 16 is tuned is in use, then the triggering circuit 102 removes the gating signal from the SCR 100, and the PTT line cannot be grounded through the SCR 100 even though the controlled conduction element 102 of the stuck microphone reliever 14' is conducting, and even though the PTT switch 54 is operated.

Considering now the stuck microphone reliever 14" of the anti-blocking device, the controlled conduction element 102 of the stuck microphone reliever 14" illustratively comprises an NPN Darlington transistor, although a power field-effect transistor may as well be employed.

The Darlington transistor 102 has a pair of main terminals, an emitter terminal 130 and a collector terminal 132, as well as a control gate terminal 134 (transistor base terminal) for controlling conduction between the emitter and collector terminals 130 and 132. As may be seen in the FIG. 1 schematic diagram, the emitter and collector terminals 130 and 132 are effectively interposed in series, along with the SCR 100, in the PTT line between the push-to-talk control terminal 62' and the push-to-talk switch circuit 54'.

Also included in the stuck microphone reliever 14" is a timing circuit 136 connected to the control gate 134 and operable to activate the Darlington transistor 102 for a predetermined limited duration upon activation of the push-to-talk switch circuit 54', and thereafter to activate the Darlington transistor 102 so long as the push-to-talk switch circuit 54' remains activated. Typically, the predetermined limited duration is in the order of fifteen seconds. The timing circuit 136 senses activation of the push-to-talk switch circuit 54' via a line 138.

A final overall element of the stuck microphone reliever 14" embodiment shown in FIG. 1 is a power supply circuit 140 for supplying operating voltage to the timing circuit 136. The power supply circuit 140 includes a connection 142 to the push-to-talk control terminal 56' via the PTT line for deriving voltage from the +28 volt voltage supply line 74 in the same manner as the power supply circuit 112 of the step-off device 14' As in the case of step-off device 14' power supply circuit 112, the power supply circuit 140 of the stuck microphone reliever 14" includes at least sufficient series-connected current limiting impedance, schematically represented by resistor 140 to limit current through the power supply circuit 140 to a level below the predetermined input level of the PTT relay 76 of the radio 12.

In overall operation, the stuck microphone reliever 14" functions to limit activation of the PTT relay 76 to a duration no longer than fifteen seconds each time the push-to-talk switch circuit 54' is activated. During normal operating conditions, the pilot actuates the push-to-talk switch 54 for durations less than fifteen seconds, and the stuck microphone reliever 14" has no effect. However, in the event of a "stuck microphone" fault such as may be caused by a short circuit to ground within the microphone enclosure 52, the connector 56 or the cord 55, or such as may be caused by inadvertent operation of the PTT switch 54, the resultant undesired transmission is limited to a maximum of fifteen seconds, after which the timing circuit 136 removes gating signal from the Darlington transistor 102. The Darlington transistor 102 remains ungated until such time as the stuck microphone reliever 14" circuit is reset by briefly de-activating the push-to-talk switch circuit 54'.

As in the case of the step-off device 14', it will be appreciated that the stuck microphone reliever 14' also derives operating voltage from the aircraft radio 12 itself, whatever that operating voltage may be, and requires no internal connections to the radio circuitry.

Although shown in combination with a step-off device 14', the inventive stuck microphone reliever 14" may also be employed by itself, requiring only a series connection in the PPT line between the microphone receptacle 56' and the microphone 56.

A final element shown in FIG. 1 is a BYPASS switch 150 for manually bypassing both controlled conduction elements 100 and 102 in the event of a malfunction in the anti-blocking device 14 itself. In addition, the BYPASS switch 150 can be used as an emergency push-to-talk switch in the event of a stuck microphone condition.

Step-Off Device Circuitry in Detail

Figure 2:
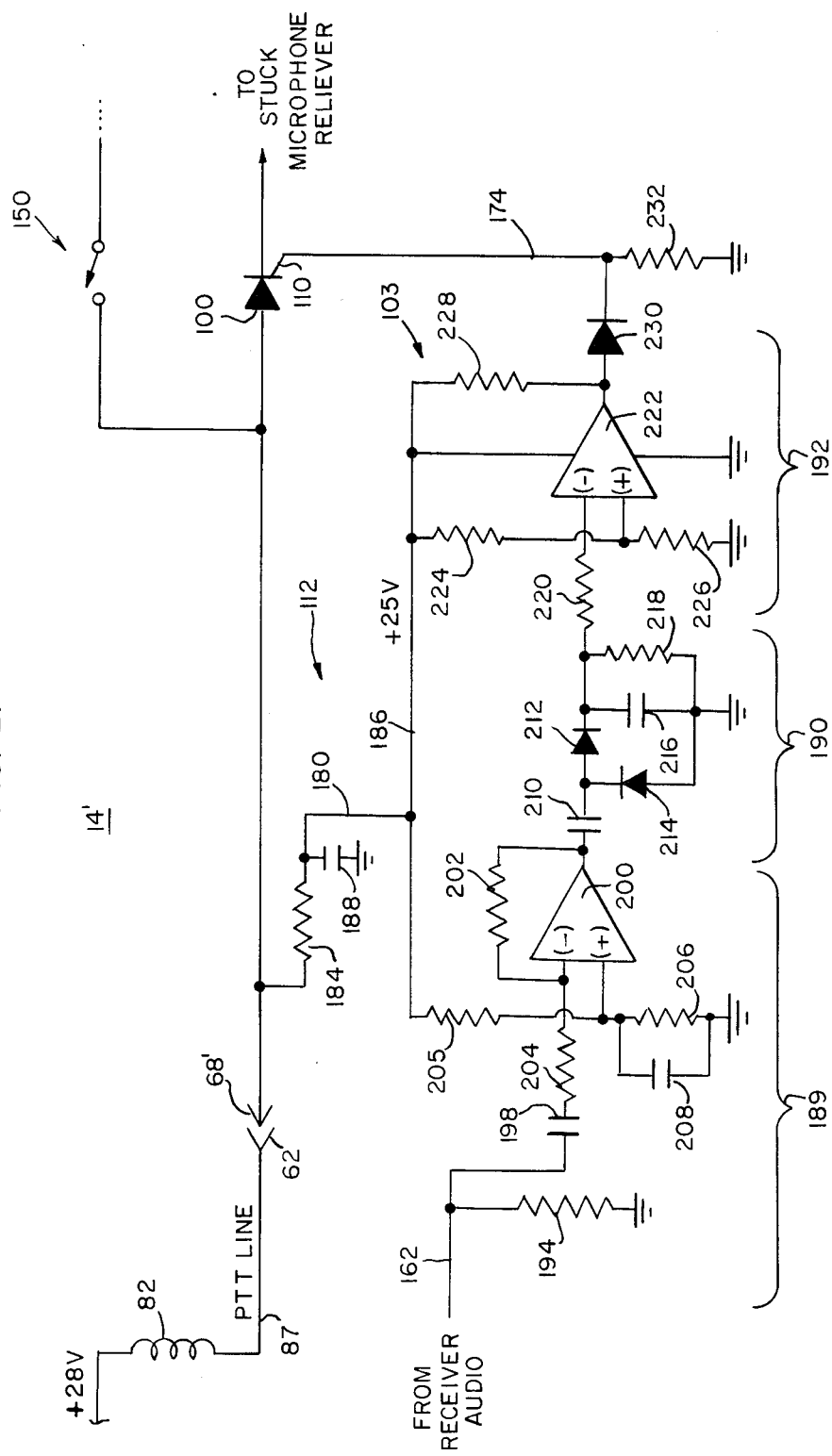
FIG. 2 is a detailed electrical schematic diagram of the step-off device portion of the FIG. 1 anti-blocking device.

Referring now to FIG. 2, FIG. 2 is a detailed electrical schematic diagram of suitable circuitry for one particular embodiment of the FIG. 1 step-off device 14'. This circuitry is also disclosed in our above-incorporated U.S. Pat. No. 4,494,244.

As mentioned above, advantageiously the specific circuitry of FIG. 2 is operable without modification or adjustment over a relatively wide range of supply voltages, at least over a range of from +12 to +28 volts. Thus, the device is useful in a wide variety of aircraft, from small general aviation aircraft to large commercial transport aircraft.

In FIG. 2, the power supply circuit 112 comprises simply a series resistor 184 connected to supply a +V line 186, and a filter capacitor 188. For purposes of example, the +V line 186 is shown as having +25 volts applied thereto.

The triggering circuit 103 comprises, in series, an audio amplifier generally designated 189, a rectifier and low pass filter circuit generally designated 190, and a voltage comparator circuit generally designated 192. The input of the audio amplifier 189 is connected to the triggering circuit input 162, and the voltage comparator 192 output is connected to and comprises the triggering circuit output 174 connected to the thyristor 100 gate terminal 110.

In detail, the audio amplifier 189 includes an input resistor 194 which serves as an input load. The signal is coupled through a coupling capacitor 198 to an operational amplifier 200. One-half of a National Semiconductor Type No. LM392 integrated circuit operational amplifier is suitable for the operational amplifier 200. In order to establish a voltage gain of one hundred, a 1.5 megohm negative feedback resistor 202 is connected between the operational amplifier 200 output and the inverting (−) input, and a 15K ohm series input resistor 204 is connected between the coupling capacitor 198 and the operatonal amplifier 200 inverting (−) input. The operational amplifier 200 non-inverting (+) input is biased at one-half the supply voltage on the +V line 186 by means of equal-valued series-connected voltage divider resistors 205 and 206. A de-coupling capacitor 208 is also connected to the comparator 200 non-inverting (+) input.

The audio amplifier 189 output is connected via a coupling capacitor 210 to the rectifier and the low pass filter circuit 190. In particular, the rectifier and low pass filter circuit comprises a pair of diodes 212 and 214 connected in fullwave voltage-doubler rectifier configuration, and an integrating and filter capacitor 216 connected to circuit ground. A resistor 218 in parallel with the capacitor 216 establishes a discharge time constant of approximately 0.15 seconds.

The rectifier and filter circuit 190 is connected through a current-limiting resistor 220 to the inverting (−) input of an integrated circuit comparator 222 within the overall comparator circuit 192. Preferably, the integrated circuit comparator 222 comprises the other half of the LM392 amplifier. The other input of the comparator 222, i.e. the non-inverting (+) input, serves as the reference input, and is connected to a reference voltage divider comprising series-connected resistors 224 and 226, which maintain approximately 2.5 volts at the non-inverting (+) input when the triggering circuit 160 is powered (assuming operation from an exemplary +28 volt supply).

A pull-up resistor 228 is connected to the comparator 222 output, and an isolation diode 230 is connected in series between the comparator 222 output and the SCR 100 gate terminal 176. Finally, to prevent false triggering, a resistor 232 is connected between the SCR 100 gate terminal 110 and circuit ground.

Considering the operation of FIG. 2, assuming first that the particular selected radio frequency channel is not in use, then a relatively low audio level is received at the input 162 and amplified by the amplifier 189. The output of the rectifier and low pass filter circuit 190 is relatively low, lower than the 2.5 volt reference voltage at the comparator 222 non-inverting (+) input. Accordingly, the comparator 222 output is high, gating the SCR 100. Accordingly, whenever the PTT switch 54 is actuated, the PTT line 87 is pulled low, activating the transmitter circuitry 18 and de-activating the receiver circuitry 16.

On the other hand, assuming the particular channel selected is in use, receiver audio on the line 162 is amplified by the audio amplifier 189, and the output of the rectifier and low pass filter circuit 190 is greater than the 2.5 volts at the comparator 222 non-inverting (+) input. Accordingly, the comparator 222 output goes low, removing the gate signal from the SCR 100. Thus, even though the PTT switch is operated, the relay coil 82 cannot be operated.

Sidetone audio during transmitting causes no particular problem because the SCR 100, once triggered into conduction, remains conducting, even though its gate drive is removed, first, by the side tone being amplified by the audio amplifier 189 and then, after the filter capacitor 188 has discharged, by the absence of a voltage supply to the triggering circuit 103.

It will be appreciated that the circuit of FIG. 2 requires minimal current during the receiving mode, and thus operating current can be drawn through the relay coil 82 without actuating the PTT relay 76. The operational amplifier 200 and the comparator 222 require minimal operating current which, in any event, is limited by the series resistor 184 in the power supply circuit 172. The SCR 100 does not consume any current in the receive mode since the cathode ground return is through the microphone PTT switch 54, which is normally open.

Stuck Microphone Reliever Circuitry in Detail

Referring next to FIG. 3, FIG. 3 is a detailed electrical schematic diagram of an exemplary stuck microphone reliever 14". The specific circuitry of FIG. 3 is also operable without modification or adjustment over a relative wide range of supply voltages, at least over a range of from +12 to +28 volts.

In FIG. 3, it will be seen that the emitter and collector terminals 130 and 132 of the Darlington transistor 102 are connected generally in series between the PTT switch 54 and the SCR 100 of the SOD 14', both shown in phantom. It will be appreciated that the Darlington 102 is of the class of devices which conduct when a voltage in excess of a threshold voltage is applied to the control gate terminal 134 with respect to one of the main terminals, in this case the emitter terminal 130. Inasmuch as the Darlington transistor 102 is capable of operation in a linear mode, it will further be appreciated that the turn-on and turn-off of the device 102 in general do not occur sharply, but, rather both turn-on and turn-off are gradual processes. However, in the subject circuit, the Darlington transistor 102 is operated primarily as a switching device and, for convenience, the term "threshold voltage" is employed.

In the circuit of FIG. 3, the emitter terminal 130 defines a circuit control node 130 and this circuit control node 130 is connected to the push-to-talk switch circuit 54' including the actual PTT switch 54 such that the circuit control node 130 is connected to the circuit reference node, represented by a ground connection, when the push-to-talk switch circuit 54' is activated.

The FIG. 1 timing circuit 136 in FIG. 3 more particularly may be seen to comprise an RC timing circuit including a timing capacitor 250, one terminal 252 of which is connected through a current-limiting resistor 254 for applying to the Darlington transistor 102 gate terminal 134 a voltage dependent upon the charge stored in the capaitor 250. Accordingly, the other terminal 253 of the capacitor 250 is connected to the circuit reference node. The timing circuit 136 also includes a timing resistance, generally designated 258, for discharging the capacitor 250 at a controlled rate to define a predetermined limited duration, e.g., fifteen seconds. In FIG. 3, the timing resistance 258 comprises the current-limiting resistor 254 and another resistor 256. Typically, the timing capacitor 250 is a 15 mfd capacitor, and the resistors 254 and 256 are each one megohm.

The FIG. 1 power supply circuit 140 in FIG. 3 more particularly may be seen to comprise a connection 260 for charging the timing capacitor 250. This connection 260 comprises series-connected resistors 262 and 264 and an isolation diode 266. An exemplary ten-volt Zener diode 268 limits the charge on the capacitor 250 to approximately ten volts. The time constant is such that the capacitor 250 fully charges in approximately one second.

In the operation of the FIG. 3 circuit as thus far described, when the PTT switch 54 is open, the capacitor 250 charges through the resistors 262 and 264 and through the isolation dide 266 to +10 volts as limited by the Zener diode 268. Upon actuation of the push-to-talk switch circuit 54' such as by closing the PTT switch 54, the circuit control node 130 is pulled to zero volts, and the Darlington transistor 102 immediately begins conducting due to voltage (or, strictly speaking, current) applied to the control gate terminal 134 from the timing capacitor 250 through the current-limiting resistor 254. So long as sufficient charge remains in the capacitor 250 the Darlington transistor 102 remains conducting. If the predetermined duration is exceeded, the timing capacitor 250 discharges through the resistor 254 and 256 to a point where the Darlington transistor 102 is no longer gated. The Darlington transistor 102 therefore ceases conducting, removing the ground connection from the PTT line.

When the push-to-talk switch circuit 54' is deactivated, such as by opening the PTT switch 54, the timing capacitor 250 fully recharges within approximately one second, ready to begin another cycle of operation.

FIG. 3 circuit includes two additional advantageous features. The first of these advantageous features is a shunt connection 138 from the charging connection 260 to the circuit control node 130 such that the timing capacitor 250 cannot be recharged so long as the push-to-talk switch circuit 54' is activated. Thus, once turned off through operation of the timing circuit 136, the Darlington transistor 102 cannot again be triggered into conduction so long as the push-to-talk switch circuit remains activated. While the shunt connection 138 remains at approximately zero volts, the isolation diode 266 prevents discharge of the timing capacitor 250 through the shunt connection 138.

For proper operation, it will be appreciated that the resistor 262 must have a sufficiently high resistance value such that current therethrough is insufficient to maintain the PTT relay coil 82 (FIG. 1) actuated when either the SCR 100 or the Darlington transistor 102 are not conducting. An exemplary value for the resistor 262 is 10K ohm.

In order to provide a sharp turn-off characteristic for the Darlington transistor 102 for a well-defined timing interval, a controlled shunting element in the form of an NPN transistor 280 is provided. The control input, i.e., the base terminal 282, of the transistor 280 is connected through a resistor 284 to sense voltage on the other of the main terminals, i.e., the collector terminal 132, of the Darlington transistor 102. For this purpose, the other end of the resistor 284 is connected to the PTT line and thus indirectly (through the SCR 100) to the collector teminal 132.

To enable the transistor 280, when conducting, to rapidly discharge the timing capacitor 250 when the Darlington transistor 102 begins to cease conducting, the emitter terminal 286 of the transistor 280 is connected through an isolation diode 287 to the circuit control node 130 which, as noted above, is substantially at zero volts when the push-to-talk switch circuit 54' is activated. The transistor 280 collector terminal 288 is connected dirctly to the capacitor 250 terminal 252. Thus, whenever the transistor 280 is conducting and the push-to-talk switch circuit 54' is activated, such as by the PTT switch 54 being closed, the timing capacitor 250 is rapidly discharged. To complete the circuit, a resistor 290 is connected between the transistor 280 emitter and base terminals.

In the operation of this final portion of the FIG. 3 circuit, as the timing circuit 136 begins to time out, the Darlington transistor 102 gradually ceases conducting, and its collector 132 voltage begins to increase. Depending upon the characteristics of the particular PTT relay within the FIG. 1 receiver circuitry 12, it will be appreciated that the drop-out current will be subject to wide variations and that a relatively imprecise timing interval would result if the Darlington transistor were merely gradually allowed to turn off. However, when the voltage on the PTT line reaches approximately two volts due to the Darlington transistor 102 beginning to cease conduction, the transistor 280 turns on and begins to discharge the timing capacitor 250. In a regenerative switching operation, it will be appreciated that as the capacitor 250 discharges through the transistor 280, the Darlington transistor 102 more rapidly turns off, causing the transistor 280 to increasingly conduct.

Failure Modes

It will be appreciated that the circuits presented herein are essentially fail-safe. Due to the series arrangement of the step-off device 14', the stuck microphone reliever 14", and the microphone push-to-talk switch 54, an inadvertent transmission is unlikely. Only a mechanical short in the flexible multi-conductor cord 90 would cause an unintentional transmission without correction by the stuck microphone reliever 14". In this case, simply unpluging the entire retrofit device and plugging in the microphone plug 56 directly into the receiver microphone receptacle 56' will correct the problem and allow normal transmissions until the anti-blocking device 14 is repaired.

Similarly, an inability to transmit due to component failures, can similarly be corrected. In many cases, the bypass switch 150 provides a temporary remedy. The pilot easily senses inability to transmit because of the lack of audio mic click, no sidetone or recognition of no transmission by other crew members.

Moreover, in the special case of an aircraft equipped with only a single microphone which is stuck, it would be possible to use the bypass switch 150 as a transmit/receive switch.

Referring finally to FIG. 4, shown is an exemplary physical form of an anti-blocking device 14 of the invention, incorporating the anti-blocking device 14 circuitry of FIG. 1, as well as the circuits of FIGS. 2 and 3. The anti-blocking device is included within a rectangular enclosure having dimensions in the order of 1×2×3 inches. As shown, the plug 63' on the end of of a relatively long cord 90 is provided for insertion into the aircraft radio microphone circuit receptacle 56', and the microphone receptacle 63 is afixed directed to the anti-blocking device 14 enclosure. For sensing received audio signal, the cord 106 is connected through the plug 40' to the splitter "Y" adaptor 43 terminating in a plug 43 for connection to a receiver audio output. The headphones can then be plugged into the other jack 31'.

Internal Embodiments

The anti-blocking device 14 of the invention up to this point has been described in the context of a retrofit device interposed generally in series with the aircraft radio microphone circuit and deriving all operating power from the radio PTT circuit. However, it will be appreciated that the functions of the invention, in particular, either a stuck microphone reliever alone, or a stuck microphone reliever in combination with a step-off device, can readily be included through internal modifications within a radio transceiver during the original manufacture thereof. A typical example of the manner in which a step-off device circuit may be included within a radio receiver is disclosed in our above-incorporated application Ser. No. 466,318. Briefly, as there disclosed, an integrated circuit comparator may be provided with its output connected to the gate of an SCR source, a reference input connected to a reference voltage source and a comparison input connected to the receiver squelch or a AGC circuitry. With such an arrangement, it will be appreciated that operating voltage for the device can readily be derived directly from the receiver power supply and, for new manufacture, is less complex.

The stuck microphone reliever circuit of FIG. 3 is suitable as is for direct inclusion within the receiver at the time of manufacture simply by connection into series with the PTT line internally into the radio. It will be appreciated that the circuit of FIG. 3 can be employed either with or without a step-off device as indicated by the SCR 100 shown in phantom in FIG. 3. The circuit could also be fitted into the microphone case.

Figure 5:
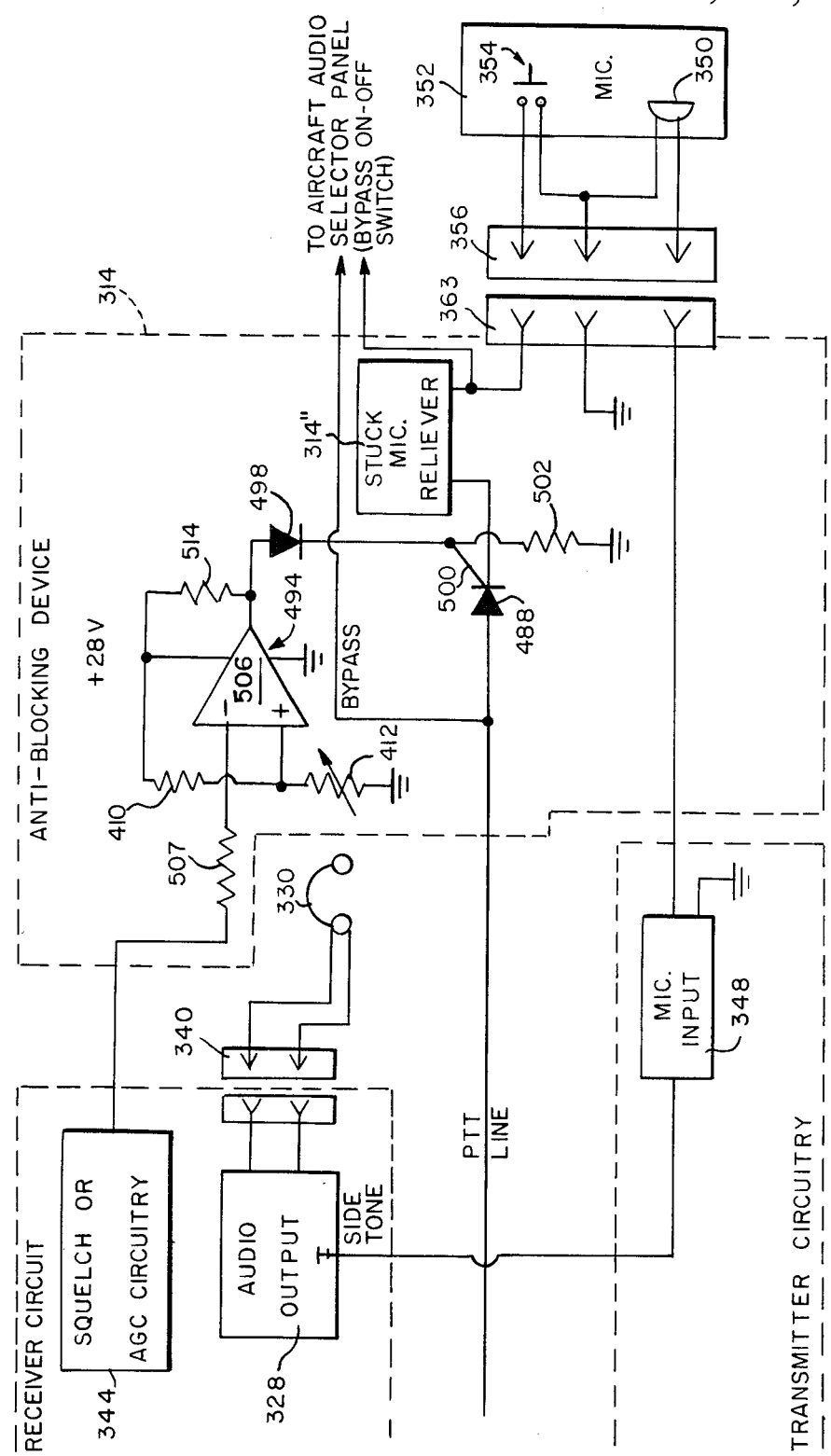
FIG. 5 is a electrical schematic diagram showing an alternate embodiment wherein the anti-blocking device is built within a common cabinet with the transmitter and receiver.

FIG. 5 shows an internal embodiment wherein an antiblocking device 314 is incorporated within a radio transceiver. The operation of the FIG. 5 embodiment will be readily apparent by noting that these parts labeled between 300 and 399 correspond to the part with the same last two digits in FIG. 1 of the present application and those parts labeled between 400 and 599 correspond to the part with a number of 400 less in FIG. 1 of U.S. Pat. No. 4,494,244. Thus, for example, the parts 314, 314", 328, 344 and 348 in FIG. 5 correspond to parts 14, 14", 28, 44 and 48 in FIG. 1, whereas parts 488, 494, 498, 500 and 506 in FIG. 5 correspond to parts 88, 94, 98, 100 and 106 in FIG. 1 of U.S. Pat. No. 4,494,244. Of course, it will be readily understood that SCR 488 functions the same as the SCR 100 in FIG. 1 of this application since there are some components common to FIG. 1 of this application and FIG. 1 of U.S. Pat. No. 4,494,244. As shown in FIG. 5, the receptacle 363, which is preferably mounted in a common housing (not shown) with the transceiver, connects to the antiblocking device 314. The antiblocking device 314 in turn connects to parts 328 and 344 of the receiver circuit.

While in no way intended to limit the scope of the claimed invention, in order to enable those skilled in the art to practice the invention without undue experimentation, the following tables provide suitable values for the various components in the circuits of FIGS. 1 and 2:

| TABLE OF EXEMPLARY COMPONENT VALUES | |
|---|---|
| Resistors All 5% Film - ¼ Watt | |
| 412 | 200K Ohm potentiometer |
| 102, 232, 262, 264, 502 | 10K Ohm |
| 107, 224, 290 | 220K Ohm |
| 184 | 1K Ohm |
| 194 | 470 Ohm |
| 202 | 1.5 Meg Ohm |
| 204 | 15K Ohm |
| 205, 206, 218 | 68K Ohm |
| 220 | 120K Ohm |
| 226 | 22K Ohm |
| 228 | 3.3K Ohm |
| 254, 256 | 1 Meg Ohm |
| 270 | 220K Ohm |
| 284 | 470K Ohm |
| 410 | 100K Ohm |
| 514 | 2.2K Ohm |
| Capacitors All 35V Tantalum | |
| 188, 208 | 10 mfd |
| 198 | 0.1 mfd |
| 210 | 0.33 mfd |
| 216 | 2.2 mfd |
| 250 | 15 mfd |
| Semiconductor Devices | |
| 100, 488 | Delco Type No. DS87 SCR |
| 102 | ECG 268 (A power FET also may be employed). |
| 212, 214, 230, 266, 287, 498 | Silicon diode |
| 268 | Zener diode, 10 volt, 0.1 watt |
| 280 | Any 50 V, 500 ma silicon transistor |
| 200, 222, 506 | LM 392 |

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. In combination with an aircraft voice communication radio of the type including radio receiver circuitry and radio transmitter circuitry selectively operable on any one of a plurality of radio frequency channels, and including a microphone switch circuit for activating the transmitter circuitry and de-activating the receiver circuitry, the microphone switch circuit being susceptible to undesired activation, an anti-blocking device comprising:

a step-off device including sensing means connected to said receiver circuitry for sensing when a particular selected radio frequency channel is in use, and a transmitter-disabling means connected to said sensing means and to the transmitter circuitry for preventing activation of said transmitter circuitry by the microphone switch circuit when the particular selected radio frequency channel is in use; and a stuck microphone reliever including a second transmitter-disabling means connected to the microphone switch circuit and to the transmitter circuitry for limiting any transmission to a predetermined duration even though the microphone switch is activated for a longer duration.

2. An anti-blocking device in accordance with claim 1, wherein said predetermined duration is in the order of fifteen seconds.

3. An anti-blocking device in accordance with claim 1, wherein said sensing means is connected to an audio output of said receiver circuitry and is operable to determine when audio output level exceeds a predetermined threshold.

4. A stuck microphone reliever for retrofit connection to an aircraft voice communication radio of the type including radio receiver circuitry; radio transmitter circuitry; and including ground connection-activated circuitry for activating the transmitter circuitry and deactivating the receiver circuitry; the ground connection-activated circuitry in turn being of the type including a voltage supply line providing supply voltage with reference to a circuit reference node, a first controlled switching element having an output portion operably connected for selectively activating the transmitter circuitry and de-activating the receiver circuitry and having a control input portion with a pair of input terminals for activating the output portion when at least a predetermined input current level flows through the input portion between the input terminals, a connection between one of the pair of switching element input terminals and the voltage supply line, and a push-to-talk control terminal connected to the other of the pair of switching element input terminals and arranged for connection to a microphone switch circuit for completing a series electrical circuit to the circuit reference node for activating the controlled switching element, the microphone switch circuit being susceptible to undesired activation; said stuck microphone reliever comprising:

a controlled conduction element having a pair of main-terminals and a control gate terminal for controlling conduction between said main terminals, said controlled element main terminals being electrically interposed in series between the push-to-talk control terminal and the microphone switch circuit such that the transmitter circuitry can be activated only while said controlled element is conducting;

a timing circuit connected to said control gate terminal and operable to activate said controlled conduction element for a predetermined duration upon activation of said microphone switch circuit, and to thereafter inactivate said controlled element so long as said microphone switch circuit remains activated; and a power supply circuit for supplying operating voltage to said timing circuit, said power supply circuit including a connection to the push-to-talk control terminal for deriving voltage from the voltage supply line through the control input portion of the controlled switching element during those periods of operation when the controlled switching element is not actuated, and including sufficient series-connected current-limiting impedance for limiting current through said power supply circuit to a level below the predetermined input current level of the controlled switching element.

5. A stuck microphone reliever in accordance with claim 4, wherein said timing circuit comprises an RC timing circuit.

6. A stuck microphone reliever in accordance with claim 4, wherein:

said controlled element conducts when a voltage in excess of a threshold voltage is applied to said control gate terminal with respect to one of said main terminals;

said one of said main terminals of said controlled conduction element is connected to the microphone switch circuit such that said circuit control node is connected to the circuit reference node when the microphone switch circuit is activated;

said timing circuit comprises:

a timing capacitor, one terminal of said timing capacitor being connected for applying to said control gate terminal a voltage dependent upon the charge stored in said capacitor, and the other terminal of said capacitor being connected to the circuit reference node; and a resistance for discharging said capacitor at a controlled rate to define the predetermined limited duration;

a connection for charring said timing capacitor from said power supply circuit;

whereby, upon activation of the microphone switch circuit, voltage from said timing capacitor is effectively applied between said control gate terminal and said one of said main terminals to cause said controlled conduction element to conduct until said timing capacitor is discharged to a point where the voltage applied to said control gate terminal is no longer in excess of the threshold voltage.

7. A stuck microphone reliever in accordance with claim 6, wherein said connection for charging said timing capacitor includes a shunt connection to said circuit control node such that said timing capacitor cannot be recharged so long as the microphone switch circuit is activated.

8. A stuck microphone reliever in accordance with claim 7, which further comprises a controlled shunting element having a control input connected to sense voltage on the other of said main terminals of said controlled conduction element and having main terminals connectd for rapidly discharging said timing capacitor when said controlled conduction element begins to cease conducting.

9. A stuck microphone reliever in accordance with claim 7, which further comprises a controlled shunting element having a control input connected to sense voltage on the other of said main terminals of said second controlled switching element having main terminals connected for rapidly discharging said timing capacitor when said controlled conduction element begins to cease conducting.

10. A stuck microphone reliever in accordance with claim 4, which further comprises:
an enclosure said controlled conduction element, said timing circuit, and said power supply circuit all being contained within said enclosure;
a microphone receptacle carried by said enclosure for receiving a plug of microphone of the type including a microphone element and a microphone switch within a single housing, said microphone receptable having a least a circuit reference connector terminal, a microphone audio circuit connector terminal, and a push-to-talk circuit connector terminal;
a microphone circuit plug attached to said enclosure for connection to a microphone circuit receptacle of the radio, said microphone circuit plug having at least a circuit reference connector terminal, a microphone audio circuit connector terminal, and a push-to-talk circuit connector terminal;
a series electrical connection from said push-to-talk circuit connector terminal of said microphone receptacle, through the main terminals of said controlled conduction element, and to said push-to-talk circuit connection terminal of said microphone circuit plug;
an electrical connection between said push-to-talk circuit connector terminal of said microphone circuit plug and said power supply circuit; and
an electrical connection between said sensing circuit connector terminal and said triggering circuit.

11. An anti-blocking device for retrofit connection to an aircraft voice communication radio of the type including radio receiver circuitry providing a received audio signal; radio transmitter circuitry; the radio receiver circuitry and the radio transmitter circuitry being selectively operable on any one of a plurality of predetermined radio frequency channels; and including ground connection-activated circuitry for activating the transmitter circuitry and deactivating the receiver circuitry; the ground connection-activated circuitry in turn being of the type including a voltage supply line providing supply voltage with reference to a circuit reference node, a first controlled switching element having an output portion operably connected for selectively activating the transmitter circuitry and deactivating the receiver circuitry and having a control input portion with a pair of input terminals for activating the output portion when at least a predetermined input current level flows through the input portion between the input terminals, a connection between one of the pair of switching element input terminals and the voltage supply line, and a push-to-talk control terminal connected to the other pair of switching element input terminals and arranged for connection to a microphone switch circuit for completing a series electrical circuit to the circuit reference node for activating the controlled switching elements, the microphone switch circuit being susceptible to undesired activation; said anti-blocking device comprising:
a step-off device and a stuck microphone reliever including respective controlled conduction elements interposed generally in series to each other between the push-to-talk control terminal and the microphone switch circuit such that the transmitter circuitry can be activated only when both of said controlled conduction elements are conducting;
said controlled conduction element of said step-off device being a thyristor having a pair of main terminals and a gate terminal for triggering conduction between said main terminals, said thyristor main terminals being electrically interposed in series between the push-to-talk control terminal and the microphone switch circuit;
said step-off device further including:
a triggering circuit having an input connected to sense the received audio signal and having an output connected to said thyristor gate terminal, said triggering circuit operable to supply a gating signal to said thyristor gate terminal only when the received audio signal level is below a predetermined threshold level; and
a power supply circuit for supplying operating voltage to said triggering circuit, said power supply circuit including a connection to the push-to-talk control terminal for deriving voltage from the voltage supply line through the control input portion of the controlled switching element during those periods of operation when the controlled switching element is not actuated, and including a series-connected current-limiting impedance for limiting current through said power supply circuit to a level below the predetermined input current level of the controlled switching element;
said controlled conduction element of said stuck microphone reliever having a pair of main terminals and a control gate terminal for controlling conduction between said main terminals, said main terminals of said stuck microphone reliever controlled conduction element being electrically interposed in series between the push-to-talk control terminal and the microphone switch circuit; and
said stuck microphone reliever further including:
a timing circuit connected to said control gate terminal and operable to activate said controlled conduction element for a predetermined limited duration upon activation of said push-to-talk switch circuit, and to thereafter inactivate said controlled conduction element so long as said microphone switch circuit remains activated; and
a power supply circuit for supplying operating voltage to said timing circuit, said power supply circuit including a connection to the push-to-talk control terminal for deriving voltage from the voltage supply line through the control input portion of the controlled switching element during those periods of operation when the controlled switching element is not actuated, and including sufficient series-connected current-limiting impedance to limit current through said power supply circuit to a level below the predetermined input current level of the controlled switching element.

12. An anti-blocking device in accordance with claim 11, wherein said timing circuit comprises an RC timing circuit.

13. An anti-blocking device in accordance with claim 11, wherein:
   said controlled conduction element of said stuck microphone reliever conducts when a voltage in excess of a threshold voltage is applied to said control gate terminal with respect to one of said terminals;
   said one of said main terminals of said conduction controlled element of said stuck microphone reliever defines a circuit control node and is connected to the microphone switch circuit such that said circuit control node is connected to the circuit reference node when the microphone switch circuit is activated;
   said timing circuit comprises:
      a timing capacitor, one terminal of said timing capacitor being connected for applying to said control gate terminal a voltage dependent upon the charge stored in said capacitor, and the other terminal of said capacitor being connected to the circuit reference node, and
      a timing resistance for discharging said capacitor at a controlled rate to define the predetermined limited duration;
   a connection for charging said timing capacitor from said power supply circuit;
   whereby, upon activation of said microphone switch circuit, voltage from said timing capacitor is effectively applied between said control gate terminal and said one of said main terminals to cause said controlled conduction element of said stuck microphone reliever to conduct until said timing capacitor is discharged to a point where the voltage applied to said control gate is no longer in excess of the threshold voltage.

14. An anti-blocking device in accordance with claim 13, wherein said connection for charging said timing capacitor includes a shunt connection to said circuit control node such that said timing capacitor cannot be recharged so long as the microphone switch circuit is activated.

15. An anti-blocking device in accordance with claim 14, which further comprises a controlled shunting element having a control input connected to sense voltage on the other of said main terminals of said controlled conduction element and having main terminals connected for rapidly discharging said timing capacitor when said controlled conduction element begins to cease conducting.

16. A stuck microphone reliever in accordance with claim 14, which further comprises a controlled shunting element having a control input connected to sense voltage on the other of said main terminals of second controlled conduction element and having main terminals connected for rapidly discharging said timing capacitor when said controlled conduction element begins to cease conducting.

17. An anti-blocking device in accordance with claim 13, wherein said triggering circuit of said step-off device comprises:
   a rectifier and low-pass filter circuit for providing a a DC voltage level representative of the received audio signal level at said triggering circuit input;
   a reference voltage source; and
   a voltage comparator having a comparison input connected to said output of said rectifier and low-pass filter circuit, a a reference input connected to the reference voltage source, and an output serving as said triggering circuit output and connected to said thyristor gate terminal.

18. An anti-blocking device in accordance with claim 17, wherein said trigger circuit further comprises an audio amplifier having an input connected to said triggering circuit input, and an output connected to said rectifier and low-pass filter circuit.

19. An anti-blocking device in accordance with claim 11, which further comprises:
   an enclosure, said controlled conduction elements, said triggering circuit, said timing circuit, and said power supply circuits all being contained within said enclosure;
   a microphone receptacle carried by said enclosure and adapted for receiving a plug of a microphone of the type including a microphone element and a push-to-talk switch within a single housing, said microphone receptacle having at least a circuit reference connector terminal, a microphone audio circuit connector terminal, and a push-to-talk circuit connector terminal;
   a microphone circuit plug attached to said enclosure and adapted for connection to a microphone circuit receptacle of the radio, said microphone circuit plug having at least a circuit reference connector terminal, a microphone audio circuit connector terminal, and a push-to-talk circuit connector terminal;
   a sensing circuit connector attached to said enclosure and having at least a sensing circuit connector terminal adapted for connection to an audio output of the radio receiver;
   an electrical connection between said circuit reference connector terminal of said microphone receptacle and said circuit reference connector terminal of said microphone circuit plug;
   an electrical connection between said microphone audio circuit connector terminal of said microphone receptacle and said microphone audio circuit connector terminal of said microphone circuit plug;
   a series electrical connector from said push-to-talk circuit connector terminal of said microphone receptacle, and through the respective main terminals of said controlled conduction elements of said stuck microphone reliever and said step-off device, and to said push-to-talk circuit connector terminal of said microphone circuit plug;
   respective electrical connections between said push-to-talk circuit connector terminal of said microphone circuit plug and said power supply circuits; and
   an electrical connection between said sensing circuit connector terminal and said triggering circuit input.

20. In combination with an aircraft voice communication radio of the type including radio receiver circuitry and radio transmitter circuitry selectively operable on any one of a plurality of radio frequency channels, and including a microphone switch circuit for activating the transmitter circuitry and de-activating the receiver circuitry, the microphone switch circuit being susceptible to undesired activation, an anti-blocking device comprising:
   a step-off device including sensing means connected to said receiver circuitry for sensing when a particular selected radio frequency channel is in use, and a transmitter-disabling means connected to said sensing means and to the transmitter circuitry for preventing activation of said transmitter circuitry by the microphone switch circuit when the particular selected radio frequency channel is in use; and a stuck microphone reliever including a second transmitter-disabling means connected to the microphone switch circuit and to the transmitter circuitry for limiting any transmission to a predetermined duration even though the microphone switch is activated for a longer duration, and, in the event the microphone switch is activated while the selected radio frequency channel is in use, preventing a transmission even after the radio frequency channel is no longer in use until the microphone switch is de-activated and then re-activated.

* * * * *